United States Patent [19]

Christian

[11] Patent Number: 4,763,989

[45] Date of Patent: Aug. 16, 1988

[54] VARIABLE IMAGING MASK FOR DELINEATING THE COMPOSITION OF A VISIBLE AREA

[76] Inventor: Gregory L. Christian, 349 Manila Dr., San Jose, Calif. 95119

[21] Appl. No.: 30,900

[22] Filed: Mar. 27, 1987

[51] Int. Cl.$^4$ .......................... G02B 5/00; G03B 9/36; G03B 27/28
[52] U.S. Cl. .................................. 350/319; 350/318; 354/245; 354/296; 355/126
[58] Field of Search ............... 350/319, 318, 315, 272; 354/222, 223, 230, 232, 245, 253, 296; 355/126, 74

[56] References Cited

U.S. PATENT DOCUMENTS

| | | | |
|---|---|---|---|
| 2,246,920 | 6/1941 | Kromholz | 33/174 |
| 2,343,015 | 2/1944 | Lewis | 354/245 |
| 2,356,668 | 8/1944 | Hineline et al. | 350/318 |
| 3,203,334 | 8/1965 | Wilson | 95/79 |
| 3,255,666 | 6/1966 | Davis et al. | 350/315 |
| 3,709,591 | 1/1973 | Alzmann | 355/126 |

OTHER PUBLICATIONS

Adams,; Ansel, The Camera; New York Graphic Society, Boston, 1980, pp. 104–105.

Primary Examiner—John K. Corbin
Assistant Examiner—Loha Ben

[57] ABSTRACT

A portable viewing mask for delineating an image to be recorded or re-composed artistically, photographically or by electro-magnetic means having a variable size viewing aperture. The mask consists of a sheath containing a movable slide which adjusts the size of the viewing aperture. The aperture is positioned with diagonally opposite corners along the sheath's longitudinal centerline. The coincident longitudinal centerlines of the slide and mask sheath result in the maintenance of a constant aperture proportion as aperture size changes. The proportion of the aperture can be any desired ratio and size. In artistic use, the mask is held a determined distance from the viewer's eye and acts both to identify a pleasing composition for recording and to shield unwanted or distracting visual elements from view. In optical recording applications, when calibrated to the user's optics, it yields a field of view identical to the field of view of the appropriate lens seen from the same spot. As a cropping tool it can be used to identify desired sub-images within a previously reproduced image.

2 Claims, 2 Drawing Sheets

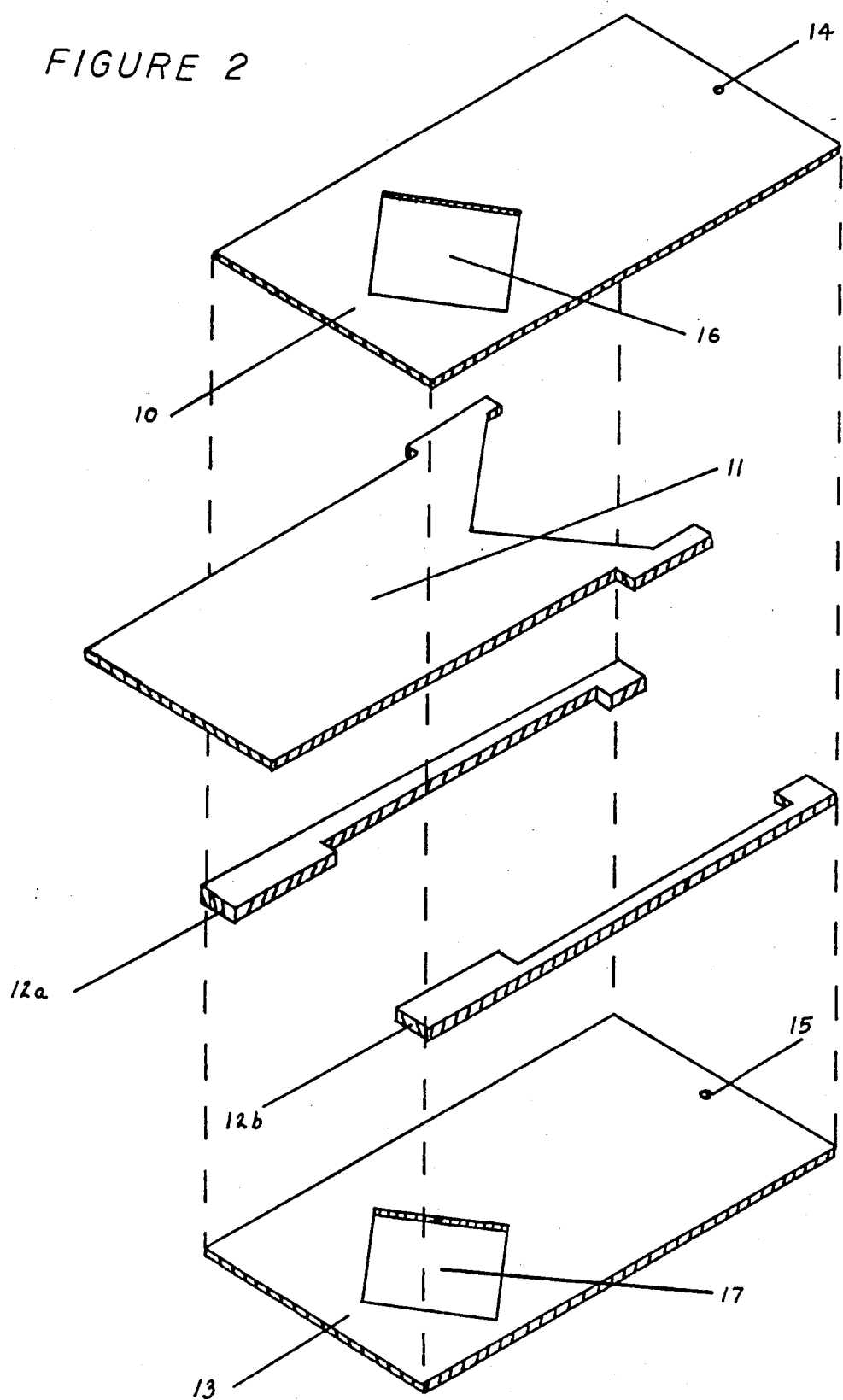

VARIABLE IMAGING MASK FOR DELINEATING THE COMPOSITION OF A VISIBLE AREA

BACKGROUND—FIELD OF INVENTION

A variable imaging mask for delineating the area of a subject scene to be recorded artistically, photographically, or by means of electro-magnetic processes, or for re-composing a previously reproduced image while maintaining constant proportions.

BACKGROUND—DISCUSSION OF PRIOR ART

Heretofore, composing an image for reproduction, primarily artistically or photographically, but increasingly via electro-magnetic processes, has been most often accomplished by viewing the subject either directly or through camera optics. This requires, in optical applications, the camera or lens to be moved by trial and error to a position which yields the desired image for reproduction. As some optical recording outfits are quite heavy and cumbersome it is desirable to identify the optimum camera location prior to set-up. In addition, especially in painting and drawing applications, mentally extracting the components of a subject or scene and arranging their spatial relationships to produce a superior image is often difficult while other aspects of the scene are competing for visual attention.

It is, therefore, helpful to use a mask to permit previewing of segments of a scene prior to equipment set-up. This permits rapid and accurate comparison of considered images while eliminating other visual distractions. It also identifies the approximate equipment location and accessory requirements, e.g. lens focal length, necessary to record the chosen image.

Accordingly, it is widely known that a simple mask can be used to achieve these objectives. A flat mask, usually cardboard, is fashioned with an aperture cut in the mask to the proportions desired for the recorded image.

In practice, the mask is held in front of the face and moved toward or away from the viewer's eye to reduce or expand the field of view respectively. The viewer can thereby compose the image quickly and effectively prior to equipment set-up.

Composition is a crucial element in determining the aesthetic quality of the recorded image. It is the composition that frequently separates an average image from an exceptional one. Although composing is an acquired skill, and as such becomes more developed with practice, it is not uncommon to see recognized professional utilize a viewing mask to fine tune the final composition. In fact this procedure is often taught to novices as a means of developing an "eye" for composition. See; Adams, Ansel, The Camera, N.Y. Graphic Society, 1980, p. 104–105.

Unfortunately, this method precludes matching the mask's field of view of the desired image at the viewer's present location with the field of view that is produced by the fixed optical imaging system, lens or lenses, of the recording apparatus. As a result, the viewer must still physically move the camera toward or away from the selected subject in order to duplicate the desired view. This results from the inability to predict what mask to eye distance is equivalent to the focal length of the available lens(es).

A previous invention, U.S. Pat. No. 3,709,591, could be used to provide a constant proportion variable aperture imaging screener as discussed above. However, it perpetuates the inability of field of view matching between the desired subject view and lens field of view without requiring camera movement after equipment set-up. Additionally, the referenced device is designed to allow two proportions to be utilized by withdrawing a slide from a sheath and replacing it in a different orientation. With repeated use in the new context that device proves to be awkward to use. Additionally, the slide becomes loose with wear and subject to loss.

Most viewers, then, would find it preferable to use a small, handheld variable aperture mask which would maintain the desired image proportion while being capable of calibration to match the field of view of available optics.

Often it is desirable to re-compose a previously recorded and reproduced image to fit a particular use, proportion, or context other than the one originally intended. This is commonly known as cropping. Cropping was, and is, most commonly performed using a pair of "L" shaped cards to delineate the desired area of the image. Used individually, although simultaneously, a constant proportion for reproduction is not easily maintained. Hence, frequent re-cropping to the necessary proportion is nearly always required after the desired image area has been selected. Previous patents pertaining to variable aperture constant proportion croppers either have designs which do not lend themselves to ease of field use, or, as cited above, are prone to parts loss and are awkward due to mutliple proportion options. These have all been designed for studio use and do not readily lend themselves to operation in the field.

OBJECTS AND ADVANTAGES

Accordingly, several objects and advantages of the present invention are: to provide a simple, handheld, portable viewing mask; durable construction with non-separable parts; to assure ease of use and maintenance under widely varying field conditions; a variable aperture size; the ability to maintain a constant image proportion throughout the range of aperture size; a means of assuring that the mask is held a determined distance from the viewer's eye both during a single use and during subsequent uses; a means of calibrating aperture size to match the field of view produced by available lenses in optical imaging applications; a non-optical device which reliably and repeatedly duplicates an image which precisely matches a lens image at the exact location of the viewer; an aid in visually isolating components of a subject or scene for artistic rendering; to provide a cropping tool which can be easily used in the field with the ability to maintain a constant proportion of the visible area.

Thus the invention provides a means of delineating a portion of a subject or scene which can be used in a variety of imaging tasks. Specifically, it overcomes limitations of previous viewing aids by allowing the user to calibrate the field of view of the mask to the field(s) of view of available optics. This results in the immediate and precise identification of recording equipment location required to capture the desired image.

This represents a definite advantage over the prior art. The design elements incorporated into the mask assure its ease of use in the field as well as the studio. Its performance is equally suited to cropping of existing reproductions and image composition for artistic or optical recording.

DRAWING FIGURES

FIG. 2 shows an exploded view of the invention from the perspective of FIG. 1.

DRAWING REFERENCE NUMERALS

Figure 1:
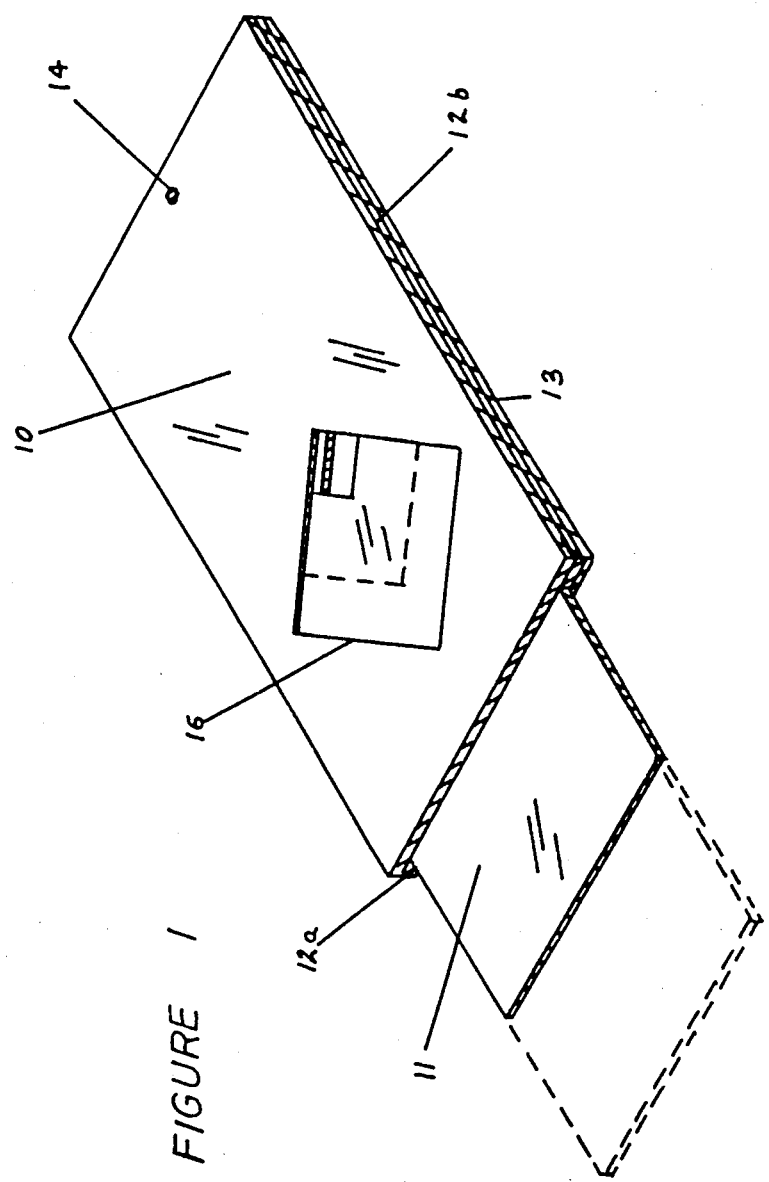
FIG. 1 shows a perspective view of the invention.

10—Mask Face
11—Slide
12—Guide Rails (12a, 12b)
13—Mask Back
14—Hole in 10
15—Hole in 13
16—Aperture in 10
17—Aperture in 13

DESCRIPTION OF INVENTION

FIG. 2 shows an exploded view of the preferred embodiment of the invention. The device is composed of a flat mask face(10) which can be dimensioned as necessary. A small hole(14) is located near one edge of the mask face(10). An aperture(16) of the desired proportion is located on the face(10). The aperture is positioned with diagonally opposite corners aligned on the longitudinal centerline of the face(10).

The face(10) is attached along opposite sides to two guide rails (12a, 12b) by means of a suitable adhesive. The guide rails are structurally and dimensionally identical. They consist of a strip matching the length of the face(10) with a protruding shoulder at each end. The guide rails (12a, 12b) are positioned such that the shoulders project toward the centerline of the mask face(10). When shoulders are of different dimensions, like shoulders are positioned at the same end of the face(10).

The lower surface of each guide rail (12a, 12b) is secured to the mask back(13) by the same adhesive as is the attachment of the rails (12a, 12b) to the mask face(10). The mask back(13) is structurally and dimensionally identical to the mask face(10), having a hole(15) and an aperture(17) as previously desribed. The mask back(13) is mounted in such a way as to align its hole(15), aperture(17) and longitudinal centerline with the complimentary openings in the mask face(10). Such placement results in the superimposing of these openings to form two integrated passages.

A slide(11) having the same thickness as the guide rails (12a, 12b) is positioned in the sheath resulting from the previously described construction. The slide(11) is shaped similarly to the face(10) and back(13) and is also a flat plate. The width of the slide(11) is dimensioned to insure that it slides smoothly between the medial edges of the guide rail (12a, 12b) shoulders without yawing. To further stabilize the sliding motion of the slide(11) and to prevent its removal from the sheath, one end is provided with protruding shoulders. These shoulders are of sufficient width to assure smooth sliding between the parallel strips of the guide rails (12a, 12b). The shouldered end of the slide(11) is notched with an angular cutout such that the dimensions and angles of the cutout match the complimentary dimensions and angles of the sheath aperture(16, 17). The slide notch and shoulder dimensions are further dimensioned to assure that the centerline of the slide(11) will be coincident with the longitudinal centerline of the sheath. The length of the slide(11) and location of the slide shoulders permit travel of the apex of the notched angle from one corner of the aperture(16, 17) along the centerline to the opposite corner. It will be apparent that the arrangement of shoulders on the guide rails (12a, 12b) and slide(11) act as positive stops to effectively lock the slide into the mask.

OPERATION OF THE INVENTION

The mask is operated by holding the unit's aperture between the eye of the viewer and the subject of scene. The slide is then moved in and out of the sheath, thus opening and closing the aperture, until the desired image is achieved.

In composing applications dependent upon optical recording instruments two factors are essential for optimum use; selection of the desired aperture proportion, and initial calibration. The determining factor for the selecton of the aperture proportion will most often be the proportion of the films or other recording medium, to be utilized. For example, a mask to be used with 4"×5" film would require an aperture with a ratio of sides of 1:1.25. Calibration is achieved as follows: The viewer determines the preferred mask to eye distance and assures that this distance can be accurately repeated in subsequent uses. For example, the viewer might place the mask at the tip of the nose, or attach a neckcord or measuring attachment that would be used as a distance measurer. Mask to eye distance must be constant in this embodiment. The user then sets up the recording equipment and selects a field of view with the lens focused at infinity. Holding the mask at the predetermined viewing distance the aperture(16, 17) size is adjusted by moving the slide(11) in and out until the field of view seen through the mask matches the field of view seen through the lens. The slide position is then marked on the mask face(10) or back(13) so as to permit future duplication of the position. It is important that the mask be held as close as possible to, and in the same orientation as, the instrument's focal plane to assure maximum correlation of the respective images. This process is repeated until the requisite lens focal lengths have been marked. The calibration process results in a set of constants; mask to eye viewing distance, slide position, and viewer location. These allow the user to match the view seen through the mask and appropriate lens from exactly the same spot. This avoids the the necessity of moving equipment after set-up.

In both photographic and artistic applications, where optics are not involved in the recording of the image, the use of the variable aperture mask in the field is most useful as a composing aid. In this application a comfortable mask to eye viewing distance is selected and the slide is adjusted until the desired composition is achieved. The portability of the mask makes it easy for the viewer to survey the scene while moving about in search of the desired perspective. Most importantly, viewing through the aperture effectively screens out unnecessary visual clutter in the scene and facilitates efficient arrangement of image elements and relationships.

In the case of previously recorded images, it is often desirable to determine if a simpler, more interesting or more meaningful composition can be achieved by eliminating a portion of the image or by changing the image proportions. This is commonly known as cropping. The variable aperture mask described is well suited to this purpose. The mask is positioned such that the entire image is visible through the mask aperture. The user can then experiment with visually altering the image by adjusting the position of the slide. If a superior image is identified it can be marked for reproduction accordingly.

CONCLUSION, RAMIFICATIONS AND SCOPE OF THE INVENTION

Thus the reader will see that the variable aperture mask described provides a compact, hand held, field or studio useable viewing aid for composing, or re-composing, images to be recorded artistically, photographically or via electro-magnetic media. In use as a composer, where optical recording instruments are utilized, it frees the user to compose multiple image possibilities quickly and effortlessly from varied positions and reliably results in duplication of the specific field of view of an identified focal length lens seen from the same spot.

Similarly used as an aid by photographers, painters and sketch artists the mask shields distracting elements from view and facilitates image composition.

In addition, the invention's use as a cropping tool allows previously recorded images to be re-composed.

A variety of construction materials lends itself to use in fabricating the invention; plastic, metal, cardboard, wood, and other materials would work equally well.

While the above description contains many specificities, the reader should not construe these as limitations on the scope of the invention, but merely as exemplifications of preferred embodiments thereof. Those skilled in the art will envision many other possible variations within its scope. For example, the optional use of a variety of accessories, including but not limited to; optical filters, viewing grids, stands, carrying lanyards, and other attachments not specificed in the drawings and descripton above could amplify the efficiency and expand the applications of use of the invention. Additionally, a means for altering the aperture proportion to any desired ratio of sides would permit composition of a variety of image proportions. Accordingly the reader is requested to determine the scope of the invention by the appended claims and their legal equivalents, and not by the examples which have been given.

I claim:

1. A variable imaging mask for delineating the composition of a visible area comprising in combination, a sheath composed of a mask face and mask back, secured in opposition by guide rails, said guide rails having shoulders projecting towards a longitudinal centerline of said sheath, said shoulders abutting against respective shoulders of a non-separable moveable slide projecting in the opposite direction of the former shoulders when said slide is at a rear end position located near said closed end, said guide rails being mounted to said mask face and mask back by a suitable adhesive, with said sheath having one open end and one closed end and containing a rectangular aperture of a specific ratio of side length to height of a convenient size passing through said sheath with diagonally opposite and equal angle corners located on said centerline, said sheath enveloping said slide, featuring a v-shaped cutout, interposed within said mask face and mask back capable of altering said aperture size from fully open, through an infinite number of intermediate positions, to fully closed, whereby proportional views of said visible area corresponding exactly to the view yielded by an optical, light amplifying or electro-magnetic imaging apparatus at the same viewer to subject distance may be continuously viewed.

2. A mask as recited in claim 1 featuring a blank calibration marking area on said sheath whereon specific slide positions necessary to duplicate said fields of view of said optical, light amplifying or electro-magnetic imaging apparatus at said same viewer to subject distance may be recorded.

* * * * *